US008270583B2

(12) United States Patent
Newberg et al.

(10) Patent No.: US 8,270,583 B2
(45) Date of Patent: Sep. 18, 2012

(54) METHOD AND APPARATUS FOR ENABLING GROUP COMMUNICATION

(75) Inventors: Donald G. Newberg, Hoffman Estates, IL (US); Ramandeep Ahuja, Chicago, IL (US); Gregory D. Bishop, St. Charles, IL (US); Peter E. Thomas, Schaumburg, IL (US); Shanthi E. Thomas, Carpentersville, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 784 days.

(21) Appl. No.: 12/340,656

(22) Filed: Dec. 20, 2008

(65) Prior Publication Data

US 2010/0158231 A1 Jun. 24, 2010

(51) Int. Cl.
*H04M 3/42* (2006.01)
(52) U.S. Cl. .............................. 379/201.01; 379/201.05
(58) Field of Classification Search ............. 379/202.01, 379/201.05; 455/517, 518, 519
See application file for complete search history.

(56) References Cited

U.S. PATENT DOCUMENTS

| | | | |
|---|---|---|---|
| 7,756,054 B2 * | 7/2010 | Huh et al. ...................... | 370/252 |
| 2006/0073795 A1 * | 4/2006 | Mayblum et al. ............ | 455/90.2 |
| 2007/0054687 A1 | 3/2007 | Akita et al. | |
| 2007/0129051 A1 * | 6/2007 | Sung et al. .................... | 455/403 |
| 2009/0303909 A1 * | 12/2009 | Farhoudi et al. ............. | 370/312 |

FOREIGN PATENT DOCUMENTS
KR    1020060014619 A    2/2006

OTHER PUBLICATIONS

PCT International Search Report Dated Jul. 19, 2010.
Baugher, M., et al., "The Secure Real-time Transport Protocol (SRTP)," Network Working Group, RFC 3711, Mar. 2004.
Rosenberg, J., et al., "SIP : Session Initiation Protocol," Network Working Group, RFC 3261, Jun. 2002.
Schulzrinne, H., et al., "RTP: A Transport Protocol for Real-Time Applications," Network Working Group, RFC 3550, Jul. 2003.
Schulzrinne, H., et al., "RTP Prole for Audio and Video Conferences with Minimal Control," Network Working Group, RFC 3551, Jul. 2003.
International Preliminary Report on Patentability and Written Opinion for counterpart International Application No. PCT/US2009/068344 mailed on Jun. 30, 2011.

* cited by examiner

*Primary Examiner* — Curtis Kuntz
*Assistant Examiner* — Amal Zenati
(74) *Attorney, Agent, or Firm* — Steven A. May; Valerie M. Davis (57) ABSTRACT

A method for enabling group communications includes: establishing a group identity for a communication group comprising a first set of communication devices, and storing an identity for each of the communication devices in the first set; establishing a session to associate a second set of communication devices with the group identity, wherein the communication devices in the second set are different from the communication devices in the first set, wherein the session with the second set of communication devices is set up irrespective of a call being initiated for the communication group; detecting a first event associated with the initiation of a call for the communication group; and in response to detecting the first event, using the stored identities to join at least one of the communication devices in the first set to the session.

14 Claims, 5 Drawing Sheets

| PRE-ARRANGED GROUP I.D. | SUBSCRIBER UNIT I.D. | MEMBERSHIP TYPE |
|---|---|---|
| 1004 | 102 | EARLY SESSION SETUP |
| 1004 | 104 | ON DEMAND SETUP |
| 1004 | 106 | EARLY SESSION SETUP |
| 1004 | 108 | ON DEMAND SETUP |

METHOD AND APPARATUS FOR ENABLING GROUP COMMUNICATION

FIELD OF THE DISCLOSURE

The present disclosure relates generally to communication systems and more particularly to a method and apparatus for enabling group communication.

BACKGROUND

In the world of communication, there are many methods to communicate over a network. Among these methods of communication is Push-to-talk (PTT). PTT is a narrowband service that allows a user to communicate over a channel merely by pressing and holding a PTT button on a communication device.

One particular version of PTT, called PoC (PTT-over-Cellular), has been implemented in networks such as Global Systems for Mobile Communications (GSM)/General Packet Radio Service (GPRS) and Code Division Multiple Access (CDMA) cellular networks. By using internet protocols (IP), these networks can provide a packet-based data service that enables information to be sent and received across a mobile telephone network. In addition, the use of internet protocols also facilitates PoC through the use of substantially instant connections. That is, information can be sent or received substantially immediately as the need arises, subject to availability of resources in the air interface.

When extending narrowband services over IP networks, Session Initiation Protocol (SIP) is used for call control due to its wide acceptance. However, the use of SIP can impact performance since the SIP messages are typically very large, and a three-way handshake is required. These are serious drawbacks, for example, when extending a Project 25 (P25) group call (e.g., for public safety applications) over an IP network due to high performance expectations for these types of calls. Some mechanisms are available for pre-establishing a session prior to a call (wherein media is transmitted) in an attempt to avoid the delay inherent in establishing a session. However, these mechanisms do not provide sufficient flexibility and can waste valuable RF resources.

Accordingly, there is a need for a method and an apparatus for enabling group communication.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a method for enabling group communication is provided. The method includes establishing a group identity for a communication group comprising a first set of communication devices, and storing an identity of each of the communication device in the first set. The method further includes establishing a session to associate a second set of communication devices with the group identity, wherein the communication devices in the second set are different from the communication devices in the first set, wherein the session with the second set of communication devices is set up irrespective of a call being initiated for the communication group. Moreover, the method includes detecting a first event associated with the initiation of a call for the communication group, and in response to detecting the first event, using the stored identities to join at least one of the communication devices in the first set to the session.

The communication devices in the first set of communication devices are on-demand session setup members of communication group and are referred to hereinafter as "on-demand members." The on-demand members can optimize the bandwidth and resource utilization by joining a session in anticipation of a call starting, such as joining at the time a call is initiated for the communication group.

The communication devices in the second set of communication devices are "early session setup members" of the communication group. The term "early session setup members" implies that the communication devices in the second set can join and leave a session at any interval in time irrespective of a call being initiated for the group. The communication devices in the second set minimize call set-up time, by establishing the session for the communication group, even if there is no active call for the communication group.

Each call controller (referred to herein after as a controller) in the communication system can be adapted, arranged, configured, or designed to establish sessions, join to the sessions, and remove from the sessions communication devices included in the communication group having the defined group identity, in accordance with the teachings herein.

Figure 1:
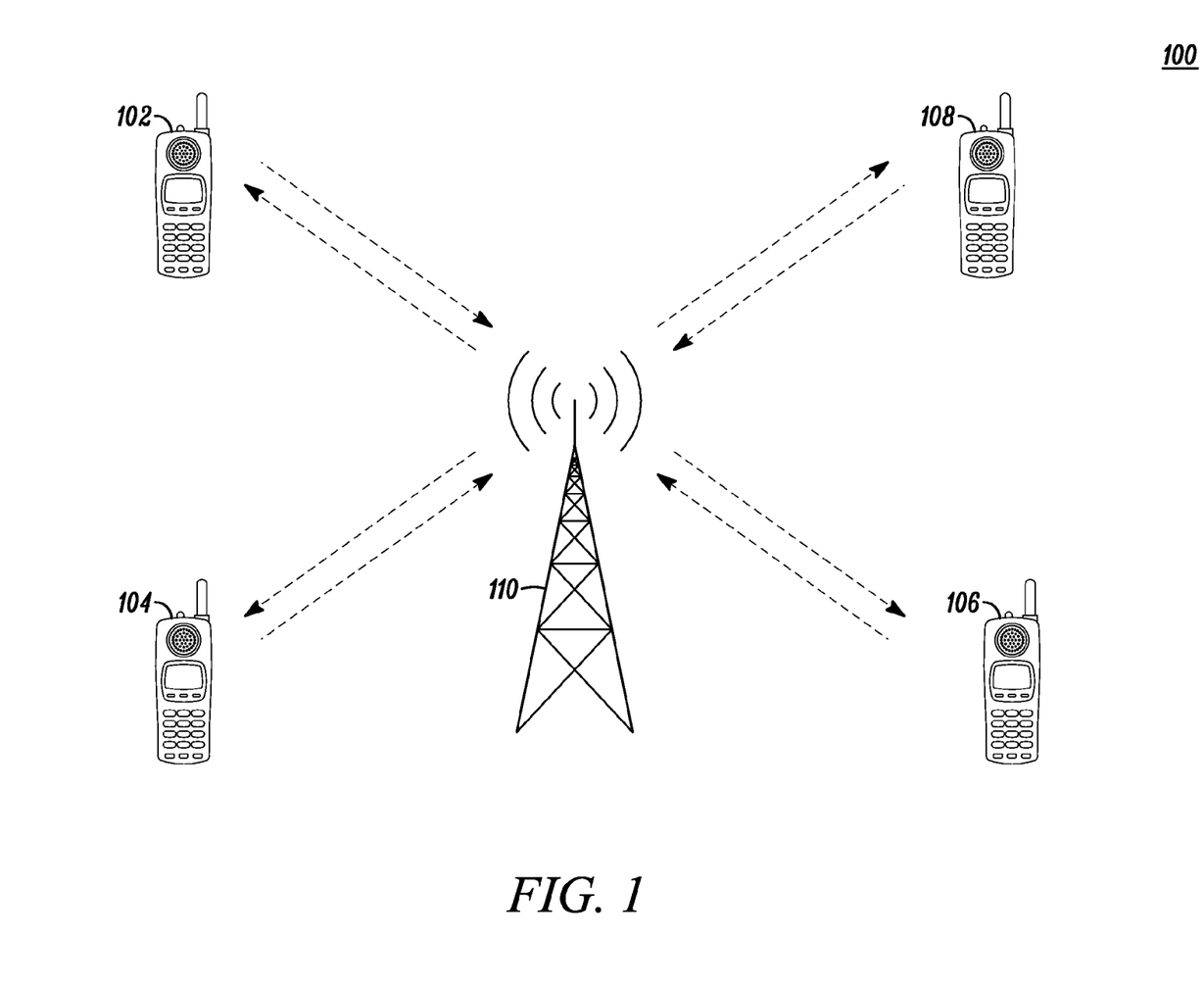
FIG. 1 illustrates a system diagram of a communication system in accordance with some embodiments.

Referring now to the figures, FIG. 1 is a system diagram illustrating a communication system 100 in accordance with some embodiments. At present, standards bodies such as OMA (Open Mobile Alliance), 3GPP (3rd Generation Partnership Project), 3GPP2 (3rd Generation Partnership Project 2), IEEE (Institute of Electrical and Electronics Engineers)

802, and WiMAX Forum are developing standards specifications for communication systems. The teachings herein may be implemented in communication systems that employ technologies including, but not limited to, those described in the OMA, WiMAX Forum, IEEE 802, and/or 3GPP2 specifications.

As used herein, a "communication system" is a system that includes one or more controllers that communicate with communication devices in the system to manage media distribution between the communication devices.

Communication system 100 is depicted in a very generalized manner. For example, communication system 100 is shown to simply include communication devices 102, 104, 106, 108, and a controller 110. The controller 110 is shown providing network services to communication devices using wireless interfaces (illustrated by dashed lines). The wireless interfaces are in accordance with the particular access technology supported by the controller 110 and the communication devices. For example, they may all utilize the same technology such as one based on Push-to-talk over cellular (PoC), or they may utilize different access technologies. Moreover, each communication device includes the capability to communicate with the controller 110 through one or more wireless communication protocols including, but not limited to, Advanced Mobile Phone System (AMPS), CDMA, Time division multiple access (TDMA), GSM, Integrated Digital Enhanced Network (iDEN), GPRS, Enhanced Data rates for GSM Evolution (EDGE), Universal Mobile Telecommunications System (UMTS), Wideband Code Division Multiple Access (WCDMA), Code division multiple access 2000 (CDMA2000), LTE (Long term evolution), WIMAX, and their variants.

The controller and communication devices are equipped with transceivers, memories and processing devices operatively coupled and adapted, arranged, configured, and designed to carry out their functionality, including any functionality needed to implement the teachings herein. The controller and communication devices are further equipped with any other elements needed for a commercial embodiment.

As used herein, a controller is a device that is a part of a fixed network infrastructure and can receive information (either control or media, e.g., data, voice (audio), video, etc.) in a signal from a communication device and transmit information in signals to one or more communication devices via a communication link. In general, communication links (also referred to herein as channels) comprise the physical communication resources (e.g., radio frequency (RF) resources) over which information is sent between the elements within system 100. Communication links can be wireless or wired.

For example, as shown in FIG. 1, controller 110 communicates with the communication devices via wireless links, which are illustrated as: dashed lines leading from the controller 110 and terminating in an arrow at each communication device, thereby indicating a downlink channel with transmissions flowing in the direction of the arrow; and dashed lines leading from each communication device and terminating in an arrow at the controller, thereby indicating an uplink channel with transmissions flowing in the direction of the arrow. The communication devices use the uplink and downlink channels for control signaling such as, for instance, registration, re-registration, session set-up and termination and floor control. The signaling for session set-up and termination is enhanced using the teachings herein.

A controller includes, but is not limited to, equipment commonly referred to as application servers, PTT servers, base stations, base transceiver stations, access points, routers or any other type of infrastructure equipment interfacing a communication device in a wired or wireless environment. As referred to herein, a communication device includes, but is not limited to, devices commonly referred to as access terminals, mobile radios, mobile stations, subscriber units, user equipment, mobile devices, or any other device capable of operating in a wired or wireless environment. Examples of communication devices include, but are not limited to, two-way radios, mobile phones, cellular phones, Personal Digital Assistants (PDAs), laptops and pagers.

Only a limited number of controllers and communication devices are shown for ease of illustration. However, system 100 can comprise any number of controllers that supports any number of communication devices, based on system requirements. Moreover, embodiments are not dependent on the applications and protocol(s) running on the devices in the system and used to facilitate communications in the system but can be used with any such applications and protocols.

For example, in this illustrative embodiment, the controller and the communication devices can implement PTT technology, which can, for instance, be based on 2.5G or 3G technologies. PTT can be used to create two-party, multiparty (group), or multicast sessions that include simple file transfers, Internet telephone calls, multimedia distribution, and multimedia conferences. One particular version of PTT is called Push to Talk over Cellular, which is abbreviated as PoC. One such example of PoC is described in a document published by Open Media Alliance (OMA) and titled "Push to talk over Cellular 2" (Candidate Version 2.0—Oct. 2, 2007), which is included as one of multiple documents in the OMA PoC Enabler Release Package (Version 2—Nov. 11, 2007).

Moreover, the PTT technology can be implemented in conjunction with an "application-layer protocol" that works in the application layer of the Open Systems Interconnection (OSI) communication model to provide services to an application running on a device. Examples of application-layer protocols that can be used with PTT are Session Initiation Protocol (SIP) as specified in Internet Engineering Task Force (IETF) Request for Comments (RFC) 3261 (Rosenberg, et al. 2002, including previous and subsequent revisions) and Real-time Transport Protocol (RTP) as specified in IETF RFCs 3550, 3551 and 3711 (respectively, Schulzrinne, et al. July 2003, Schulzrinne, et al. July 2003, and Baugher, et al. March 2004, with each RFC including previous and subsequent revisions), for creating, modifying and terminating sessions with one or more communication devices.

Figure 2:
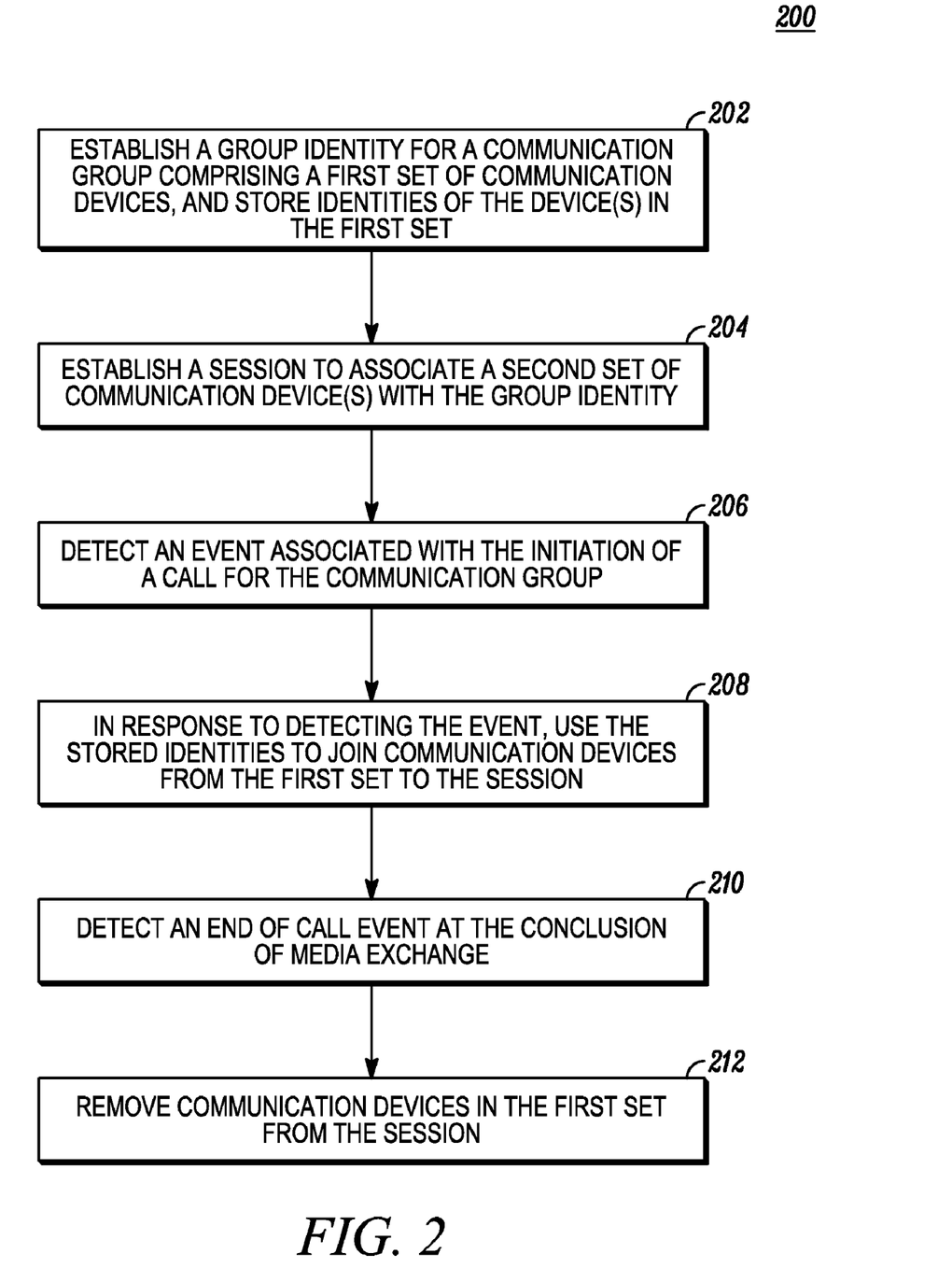
FIG. 2 illustrates a method of enabling group communication in accordance with some embodiments.

Turning now to FIG. 2, illustrated therein is a method 200 in accordance with the teachings herein for enabling group communication in a communication system, such as system 100. FIG. 2 illustrates a method 200 performed at a controller, such as the controller 110. In one embodiment, the controller comprises a PTT server and a SIP user agent server, and the communication devices also implement PTT technology and comprise a SIP user agent client. It should be realized that method 200 includes functionality that may be performed in hardware, firmware, software, or a combination thereof and may further be performed at a single hardware device or a combination of hardware devices at multiple devices. Also, one or more steps of method 200 can be facilitated by supporting external hardware units.

In accordance with the method 200, the controller 110 establishes (202) a group identity for each communication group whose communications the controller manages. For example, the controller can be pre-configured with group identity information (e.g., a group identifier that uniquely identifies each group) or can receive that information in messages from one or more communication devices that want to associate to the group. The controller 110 stores the identity of each communication group, associated with the controller 110, and also stores an identity for each communication device associated with each communication group.

For illustrative purposes, let communication devices 104 and 108 comprise the first set of communication devices, which are the "on-demand members" of the communication group. The communication group is defined by a group identity, and sessions for the communication group are formed with the assistance of one or more controllers. The controller manages and controls the transfer of media between the communication devices within the group. In an illustrative embodiment, each communication device in the first set of communication devices registers with the controller to become an on-demand member of the communication group. The communication devices can, for instance, register using a SIP REGISTER message, although other registration techniques may be used without departing from the scope of the teachings herein.

To further facilitate communications within system 100, each communication device can send additional registration details to the controller that may include, but are not limited to, an identifier, resource capabilities (e.g., audio, video, data capabilities, etc.), bit rates supported, resource priority level, and power levels for the communication device. Other methods of acquiring on-demand membership in a communication group include, but are not limited to, the communication device being provisioned as an on-demand member, or using some sort of affiliation technique to acquire on-demand membership. Upon registering with the controller using any suitable method, the controller stores (202) the identities of the communication devices in the first set.

The first set of communication devices sets up a session for the communication group only in association with a call starting for the communication group. More particularly, when the controller detects (206) an event associated with the start of a call, the controller obtains the stored identities of communication devices in the first set and sends (208) an invite to at least some of the communication devices in the first set to join the session for the communication group. It should be noted that the start of a call need not necessarily happen substantially instantaneously with the detected event that triggers the controller's invitation of the on-demand members to the session. The call may be at some set or scheduled time in the future, and responsively, the on-demand members are invited to set up a session in anticipation of the scheduled call.

The type of signaling (e.g., exchange of messages) used to facilitate a communication device joining or establishing a session (and leaving or terminating a session) for the communication group depends on the various protocols used in the system. In one illustrative embodiment, an application layer protocol is used, and in a more particular embodiment, SIP signaling is used. The detected event that triggers the invite from the controller to the communication devices in the first set could include, but is not limited to, a media burst request (e.g., a talk burst request or a request to send any type of media) from any of the communication devices associated with the group, a SIP INVITE message from a communication device in the first set, etc.

A "call" can be contrasted with "a session". A call, as the term is used herein, describes an exchange of related media transmissions between the members of the communication group, wherein the call is always characterized by an initiation and a termination. Whereas, a communication device setting up or joining a session for the communication group indicates various resources are reserved for the communication device, and the communication device is entitled to (and is in a state to) receive and/or transmit media for the communication group whenever the call actually occurs. For the on-demand communication devices in the first set, their established session remains active only during the course of a call, whereupon the session is terminated when the call ends. However, communication devices from the second set (the early session setup members) maintain the session irrespective of an active call taking place, such that one or more calls could take place during the session. Since the on-demand members are invited by the controller to join the session when a call for the session is being initiated, each of the devices in the first set can efficiently utilize bandwidth by delaying the time when session set up occurs. The early session setup members on the other hand can quickly connect to a call when it starts because it has already completed the time consuming session setup messaging exchanges. Thus, according to the teachings herein more flexibility is provided for session set up for communication devices associated with the same communication group.

The system 100 further includes communication devices 102 and 106 that comprise a second set of communication devices. The second set of communication devices are the early session setup members of the communication group. In an illustrative embodiment, each communication device in the second set of communication devices registers with the controller and exchanges appropriate session setup signaling with the controller to become associated with the communication group as an early session setup member. The communication devices can, for instance, register using a SIP REGISTER message, although other registration techniques may be used without departing from the scope of the disclosure herein. SIP signaling can further be used to establish (204) the session for the communication group (e.g. SIP INVITE/OK/ACK messages). To further facilitate communications within system 100, each communication device can send additional registration details to the controller that may include, but are not limited to, an identifier, resource capabilities (e.g., audio, video, data capabilities, etc.), bit rates supported, resource priority level, and power levels for the communication device. Other methods of acquiring the early session setup membership in a communication group include, but are not limited to, the communication device being provisioned as the early session setup member, or using some sort of affiliation technique to acquire the early session setup membership.

The communication devices in the second set have the session established (204) at all times, even if there isn't an active call for the communication group. Therefore, the second set of communication devices minimize the setup delays for participating in a call, by having the session setup at all times.

Figure 3:
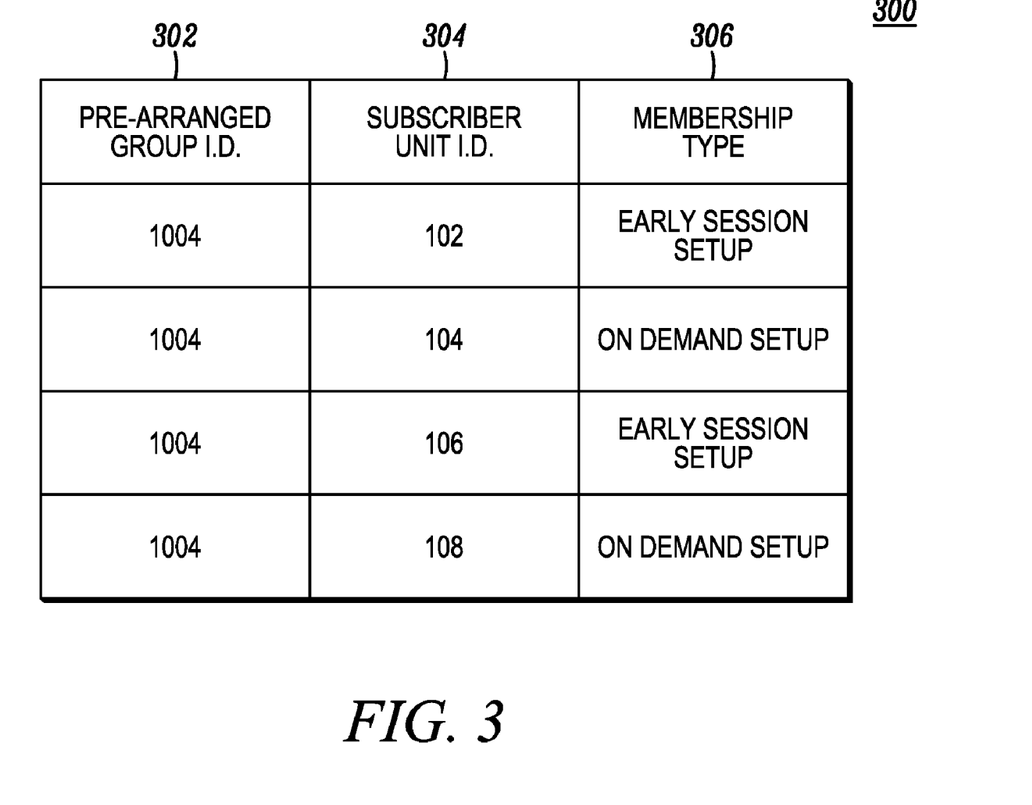
FIG. 3 illustrates a database maintained at a controller in accordance with some embodiments.

The controller 110 manages the media distribution between the first and second sets of communication devices that are associated with the communication group. To facilitate this, the controller 110 stores the identity of each communication device in the first set in an associations database (as illustrated by FIG. 3); and utilizes the information stored in the associations database 300 to join to the session the communication devices in the first set of communication devices, for example upon receiving a request to start a call. More particularly, the controller 110 sends an invite message to each communication device in the first set of communication devices; and in response to the invite message, each communication device in the first set accepts the invitation to establish a session with the controller. As mentioned above, the communication devices in the second set establish a session with the controller irrespective of a call taking place for the communication group.

Upon completion of the media exchange during the call, the controller 110 detects (210) an end of call event. The controller 110, in response to detecting the end of call event, terminates (212) the session for each communication device in the first set of communication devices. In one embodiment, the controller 110 sends a SIP BYE message to each communication device in the first set of communication devices, although other termination techniques may be used without departing from the scope of the teachings herein. The session for the second set of communication devices is not terminated. The phrases "terminating the session" or "removing from the session" are used hereinafter is to specify that the communication devices will not send or receive any additional media, unless the controller or the device repeats the process to establish a session. The end of call event can be, for example, signaling from one of the communication devices in the session to end the call or the expiration of a session idle timer that is reset after each transmission in the call.

To assist the controller 110 in managing the memberships of the various communication groups and the members associated with the communication group, the controller 110 defines and stores the information that it can readily access. Such information could include, for example, a communication group identification (ID) corresponding to each communication group, which is controlled by the controller 110. Further, the controller uniquely defines an identifier for each communication device associated with each communication group, and an identifier to determine whether the communication device is an on-demand or early session setup member. Such information can be stored in any suitable storage device either integrated within the housing of the device (e.g., a Random Access Memory) or in a separate physical device to which the communication device has access. Moreover, such information may be maintained in any number of forms such as, but not limited to, a database of associations.

Referring to FIG. 3, illustrated is an example database of associations 300 for controller 110, which includes an association between a communication group (having a group identification of 1004), and several communication devices (having respective identifications of 102, 104, 106, 108). The associations database also includes an identifier to determine whether the communication device joins the session on-demand (e.g., at the time of a call) or establishes the session early (irrespective of the start of a call). The associations database 300 includes in a communication group ID field 302 a list of communication group identifiers to identify a communication group associated with the controller. For the ease of illustration, the associations database 300 illustrates only one communication group ID. However, the database is maintained for all the communication groups that are controlled by the controller 110. The associations database 300 further includes in a communication device ID field 304 an ID (102, 104, 106, and 108) to identify the communication device that are associated with and included in the communication group 1004. The associations database 300 also includes a membership type field 304 to identify the type of association/membership each communication device is entitled to, within the communication group.

Figure 4:
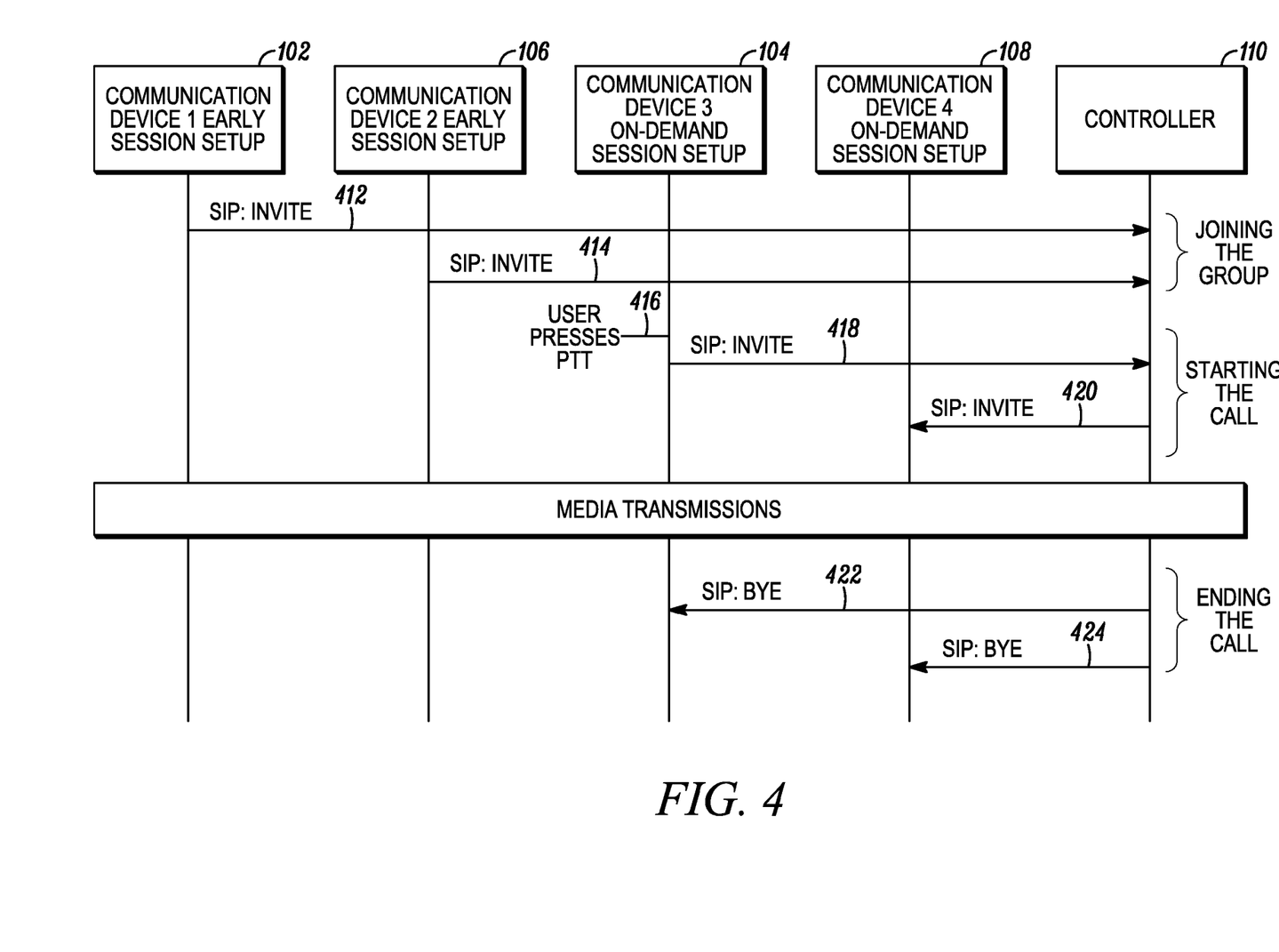
FIG. 4 illustrates a signal flow diagram in accordance with some embodiments.
Figure 5:
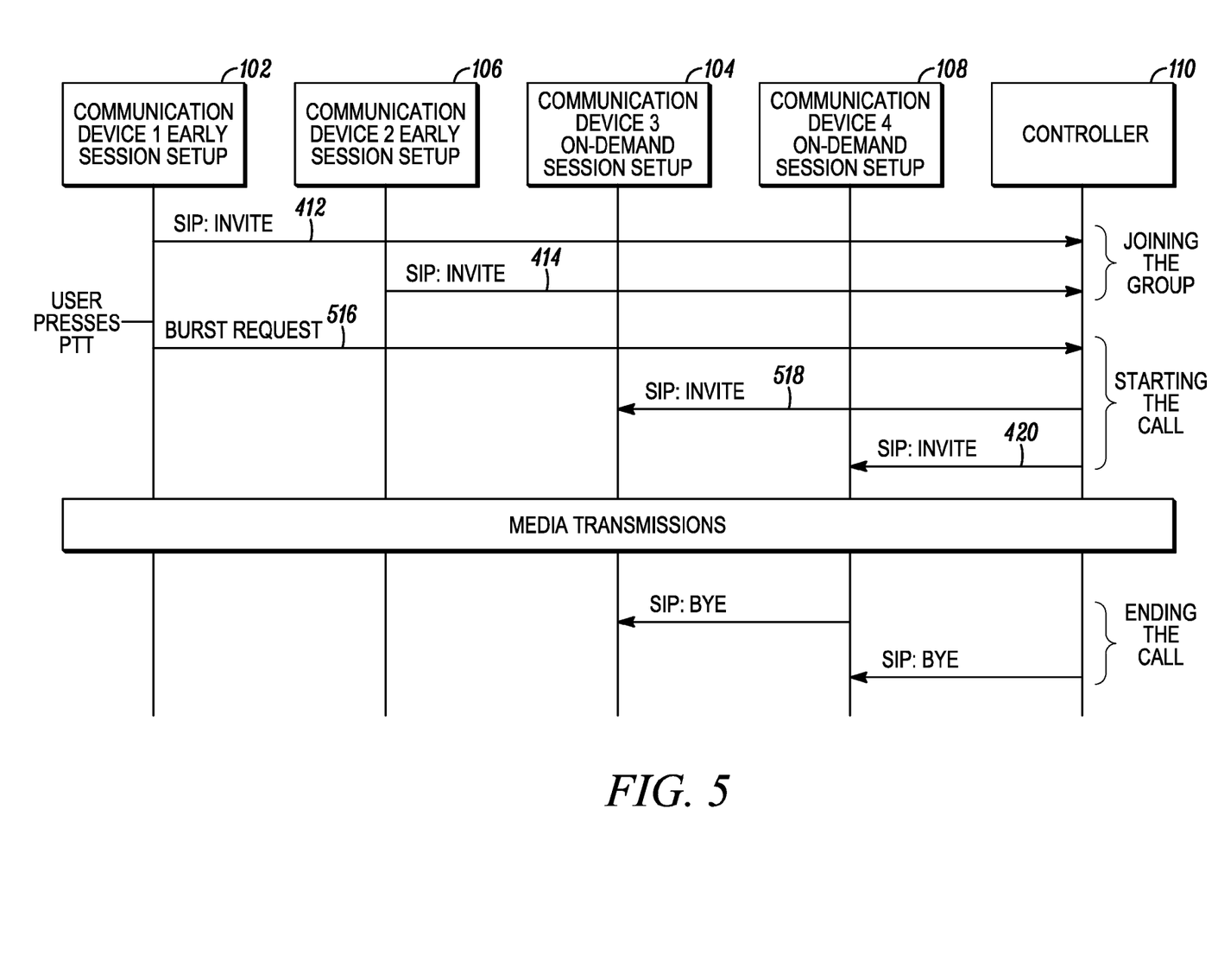
FIG. 5 illustrates a signal flow diagram in accordance with some embodiments.

FIG. 4 and FIG. 5 each illustrate a signaling flow between the controller 110 and communication devices 102, 104, 106, and 108 (included in the system 100) to establish a session for distributing media to these communication devices. The media can be any form of media as mentioned above. Specifically FIG. 4 illustrates an embodiment, wherein one of the first set of communication devices initiates a call for the communication group.

The communication devices 104, 108 are on-demand members of the communication group. Communications devices 102, 106 are early session set up members of the communication group. The second set of communication devices by utilizing the teachings herein, are enabled to participate in the call. Further, each of the communication device in the second set also minimizes the call set up time, by establishing a session for the communication group even if a call for the group has not initiated.

To establish the session, the second set of communication devices (here devices 102, 106) send a SIP INVITE message (412, 414) to the controller 110. The controller 110 houses or is otherwise coupled to a controlling PTT server, which manages distribution of media to the communication group during a call. The SIP INVITE at least identifies the communication group. The controller 110, on receiving the SIP INVITE message, establishes the session with the communication devices (102, 106). At a subsequent interval of time, a user of a communication device within the first set of communication device presses (416) the PTT button on the communication device (here communication device 104). The communication device generates and sends a SIP INVITE message (418) to the controller 110. The header of the SIP INVITE message contains special signaling for specifying, to the controller 110, that the SIP INVITE message is a request message to initiate the call for the session. The controller 110 on receiving the SIP INVITE message with the special signaling, determines (not shown) the list of communication devices in the first set of communication device by accessing associations database 300. Thenceforth, the controller 110 sends an invitation (420), to the communication devices in the first set, to join the call for the session (here communication device 108).

Subsequently, the controller 110 sends a floor grant message (not shown) using any suitable floor control protocol, to the initiator (here communication device 104). This is followed by media transmission between the initiator and the first and second set of communication devices for the call. On completion of the media transmission, the controller detects an end of call event (not shown). In one embodiment, one of the communication devices in the session ends the call (e.g., via a SIP BYE message). In another embodiment, a session idle time expires. The controller 110, on detecting the end of call event terminates the session for the communication devices in the first set of communication devices. In one embodiment, the controller 110 sends a SIP BYE message (422, 424) to the communication devices in the first set of communication device (104, 108) to remove them from the session. However, other protocols and messages may be used for terminating the session for the communication group without departing from the scope of the disclosure herein. The session for the second set of communication devices is not terminated.

Specifically referring to FIG. 5, illustrated is an embodiment, wherein a communication device from the second set of communication devices initiates the call. The signaling flow in this embodiment only differs from the embodiment illustrated in FIG. 4 in terms of the device that initiates the call, and the message used to initiate the call for the communication group. The initiator device (here 102) sends a media burst request message (516) to initiate the call for the communication group. In one illustrative example, the media burst request is a talk burst request sent using floor control signaling techniques. In another illustrative example, the media request an OMA PoC media burst request. Also, in this case, the controller sends SIP INVITEs 420, 518, respectively to on-demand devices 108, 104, upon detection of the burst request 516 from device 102.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for enabling group communication, the method comprising:
    establishing a group identity for a communication group comprising a first set of communication devices, and storing an identity for each of the communication devices in the first set;
    establishing a session to associate a second set of communication devices with the group identity, wherein the communication devices in the second set are different from the communication devices in the first set, wherein the session with the second set of communication devices is set up without a call being initiated for the communication group;
    detecting a first event associated with the initiation of a call for the communication group; and
    in response to detecting the first event, using the stored identities to join at least one of the communication devices in the first set to the session;
    wherein the call comprises an exchange of related media transmissions between members of the communication group, wherein the call is characterized by an initiation and a termination; and
    wherein the session for the communication group indicates various resources are reserved for a communication device within the group, and the communication device is entitled to (and is in a state to) receive and/or transmit media for the communication group whenever the call occurs.

2. The method of claim 1 further comprising:
    detecting an end of call event; and
    responsive to the end of call event, removing from the session only the communications from the first set that have joined the session.

3. The method of claim 2, wherein an application layer protocol is used to establish the session, join to the session the at least one communication device from the first set, and remove from the session only the communication devices from the first set that have joined the session.

4. The method of claim 3, wherein the application layer protocol is Session Initiation Protocol.

5. The method of claim 2, wherein the end of call event comprises signaling from one of the communication devices participating in the call.

6. The method of claim 2, wherein the end of call event comprises expiration of a session idle timer.

7. The method of claim 1, wherein the first event comprises signaling from one of the communication devices in the second set.

8. The method of claim 6, wherein the signaling comprises a media burst request.

9. The method of claim 8, wherein the media burst request comprises a Open Mobile Alliance Push-to-Talk Over Cellular (OMA PoC) media burst request.

10. The method of claim 8, wherein the media burst request is a talk burst request.

11. The method of claim 1, wherein the first event comprises signaling from one of the communication devices in the first set.

12. The method of claim 11, wherein the signaling comprises a Session Initiation Protocol INVITE.

13. A device for enabling group communication, the device comprising:
   a transceiver; and
   a processing device operatively coupled to the transceiver, the processor for:
      establishing a group identity for a communication group comprising a first set of communication devices, and storing an identity for each of the communication devices in the first set;
      establishing a session to associate a second set of communication devices with the group identity, wherein the communication devices in the second set are different from the communication devices in the first set, wherein the session with the second set of communication devices is set up without a call being initiated for the communication group;
      detecting a first event associated with the initiation of a call for the communication group; and
      in response to detecting the first event, using the stored identities to join at least one of the communication devices in the first set to the session;
   wherein the call comprises an exchange of related media transmissions between members of the communication group, wherein the call is characterized by an initiation and a termination; and
   wherein the session for the communication group indicates various resources are reserved for a communication device within the group, and the communication device is entitled to (and is in a state to) receive and/or transmit media for the communication group whenever the call occurs.

14. A non-transitory computer-readable storage element having computer readable code stored thereon for programming a computer to perform a method for enabling group communication, the method comprising:
   establishing a group identity for a communication group comprising a first set of communication devices, and storing an identity for each of the communication devices in the first set;
   establishing a session to associate a second set of communication devices with the group identity, wherein the communication devices in the second set are different from the communication devices in the first set, wherein the session with the second set of communication devices is set up without a call being initiated for the communication group;
   detecting a first event associated with the initiation of a call for the communication group; and
   in response to detecting the first event, using the stored identities to join at least one of the communication devices in the first set to the session;
   wherein the call comprises an exchange of related media transmissions between members of the communication group, wherein the call is characterized by an initiation and a termination; and
   wherein the session for the communication group indicates various resources are reserved for a communication device within the group, and the communication device is entitled to (and is in a state to) receive and/or transmit media for the communication group whenever the call occurs.

* * * * *